(12) United States Patent
Rodgers

(10) Patent No.: US 9,183,417 B2
(45) Date of Patent: Nov. 10, 2015

(54) SECURITY CENTRAL PROCESSING UNIT MONITORING OF ON-CHIP CONDITIONS

(71) Applicant: Broadcom Corporation, Irvine, CA (US)

(72) Inventor: Stephane Rodgers, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/675,808

(22) Filed: Nov. 13, 2012

(65) Prior Publication Data

US 2014/0053259 A1    Feb. 20, 2014

Related U.S. Application Data

(60) Provisional application No. 61/684,499, filed on Aug. 17, 2012.

(51) Int. Cl.
  G06F 21/81    (2013.01)
(52) U.S. Cl.
  CPC ....................................... G06F 21/81 (2013.01)

(58) Field of Classification Search
  None
  See application file for complete search history.

(56) References Cited

U.S. PATENT DOCUMENTS

| | | | |
|---|---|---|---|
| 6,553,496 B1 * | 4/2003 | Buer | 726/34 |
| 6,772,356 B1 * | 8/2004 | Qureshi et al. | 713/321 |
| 7,454,634 B1 * | 11/2008 | Donovan et al. | 713/322 |
| 7,454,649 B2 * | 11/2008 | Yoshida et al. | 713/500 |
| 7,472,305 B1 * | 12/2008 | Hershman et al. | 713/500 |
| 2009/0060194 A1 * | 3/2009 | Mackey et al. | 380/277 |
| 2009/0157936 A1 * | 6/2009 | Goss et al. | 710/264 |

* cited by examiner

Primary Examiner — Benjamin Lanier
(74) Attorney, Agent, or Firm — Brinks Gilson & Lione

(57) ABSTRACT

A system includes a security processing unit to monitor inputs from process, voltage and temperature sensors to maintain a security of the system. The security processing unit can operate at a determined clock frequency. A timing path detector can connect with the security processing unit. The timing path detector can monitor a condition near the security processing unit. The timing path detector can switch the clock frequency to a lower frequency before the security processing unit fails from the condition.

20 Claims, 3 Drawing Sheets

SECURITY CENTRAL PROCESSING UNIT MONITORING OF ON-CHIP CONDITIONS

PRIORITY CLAIM

This application claims priority to U.S. Provisional Application Ser. No. 61/684,499, filed Aug. 17, 2012, which is incorporated herein by reference in its entirety.

TECHNICAL FIELD

This disclosure relates to security processors for integrated circuitry, and to maintaining operation of security processor during out-of-bounds conditions.

BACKGROUND

With the rise in enterprise network security breaches and increasing concerns related to social media sites and data stored in the cloud, security experts, suppliers and service providers try to improve network security. Hardware-based authentication provided by a system on a chip (SoC) can offer security for important user data.

The security platform can be leveraged across product families and form-factors, allowing information technology (IT) managers to have a consistent security platform throughout the organization. The secured systems can be used in smartphones and consumer electronic devices and can be utilized in personal computers (PCs) and tablets for user authentication, payment, virtual currency transactions, ticketing, advertising, and location-based services and applications.

BRIEF DESCRIPTION OF THE DRAWINGS

The systems and methods may be better understood with reference to the following drawings and description. In the figures, like reference numerals designate corresponding parts throughout the different views.

DETAILED DESCRIPTION

A system and method can include a timing path detector connected with a security processing unit. The security processing unit can monitor inputs from process, voltage and temperature sensor modules to maintain a security of the system. The timing path detector can switch the security processing unit between a high operating frequency for peak performance and a low operating frequency to maintain operation of security functions when an out-of-bounds condition exists.

Figure 1:
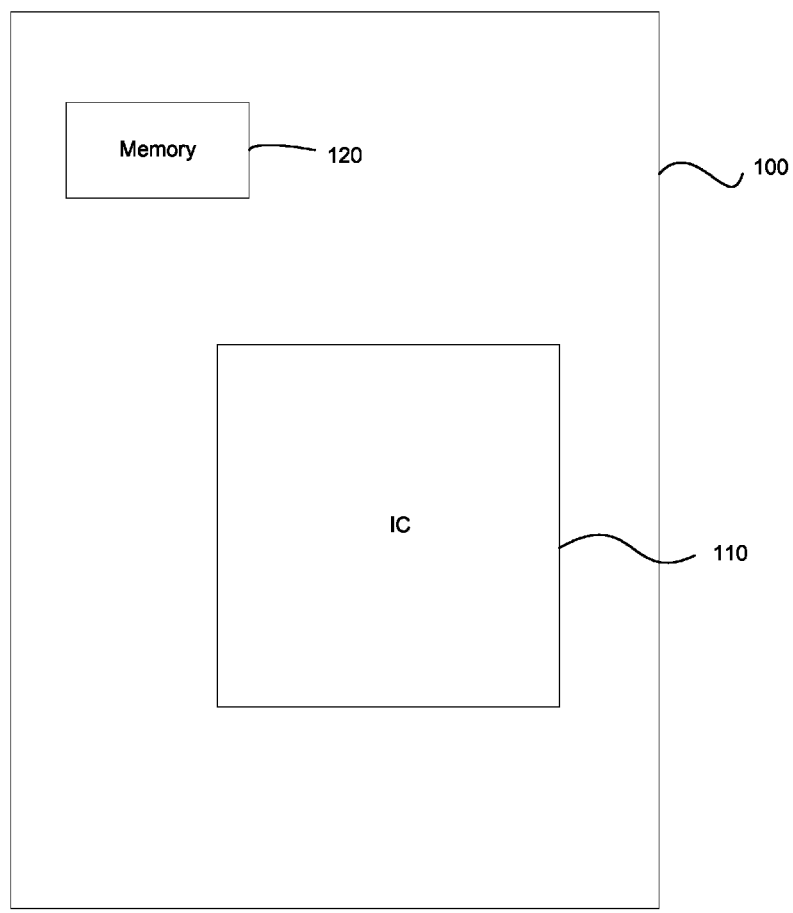
FIG. 1 is an electronic device including an integrated circuit and a memory.

FIG. 1 is an electronic device 100 including an integrated circuit 110 and a memory 120. The device 100 can be any of a variety of industrial and consumer electronic devices such as a set top box, a personal digital assistant (PDA), a television, a phone, a watch, a personal computer (PC), a tablet, a laptop, etc. Logic, circuitry, interfaces and/or code of the device 100 can be implemented with the integrated circuit (IC) 110, e.g. system on chip (SOC) circuitry, and the memory 120. On-chip process voltage temperature (PVT) conditions can be monitored on the SOC circuitry and other integrated circuitry to help ensure that the system is operating securely.

Figure 2:
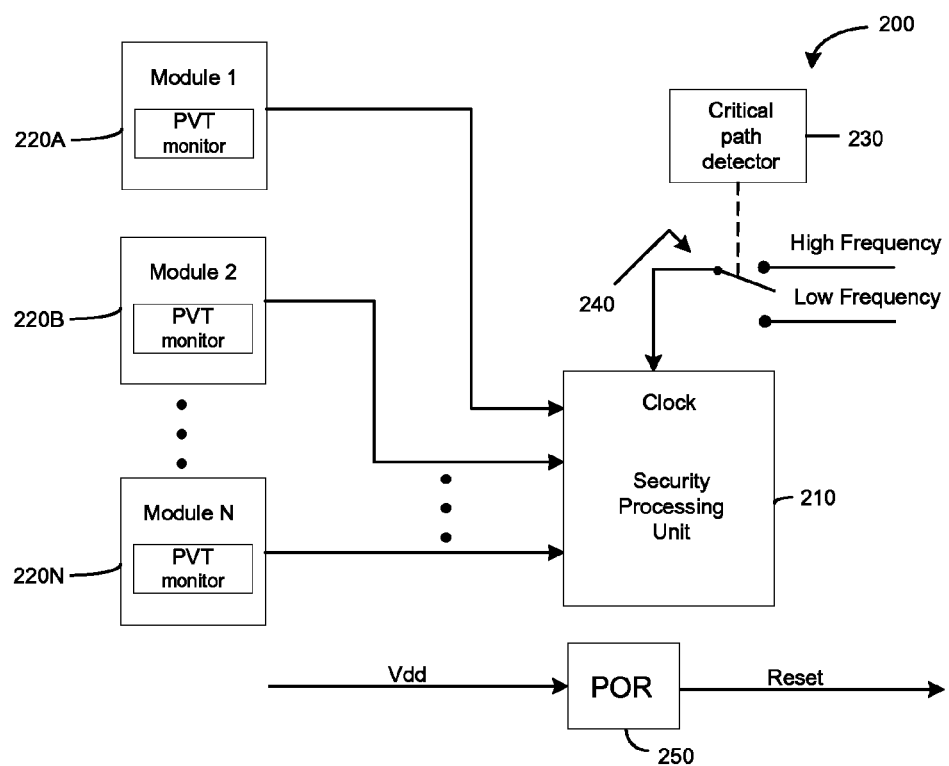
FIG. 2 is a block diagram of exemplary circuitry for monitoring PVT conditions.

FIG. 2 is a block diagram of exemplary circuitry 200 for monitoring PVT conditions. The circuitry 200 can include the IC 110 of FIG. 1. The circuitry 200 can include a security processing unit 210 or central processing unit (CPU). The security processing unit 210 can connect to the system sensors 220A, 220B, 220N. The sensors 220A, 220B, 220N can include PVT monitors to monitor the PVT conditions of the integrated circuit 100. The security processing unit 210 can also connect with a timing path detector 230, e.g., positioned physically proximate to or near the security processing unit 210.

Security attacks on SOC's, such as the IC 110, can include putting the SOC outside of normal operating conditions. Hackers may attack the chip with temperature, voltage, or other out-of-bounds operating conditions. The sensors 220A, 220B, 220N can detect these conditions and send signals to the security processing unit 210 to report the conditions. Monitoring of the sensors 220A, 220B, 220N may require the security processing unit 210 to operate at a higher frequency to meet various usage scenarios, since the security processing unit 210 may also function as a key router and also perform other system security related tasks. The security processing unit 210 may be needed to perform many tasks which require a high throughput, e.g., bandwidth. A security processing unit that only operates at a lower frequency may be able to better withstand out-of-bounds conditions but may not be the only security central processing unit in the system. A higher performance security central processing unit may be needed in addition to the lower frequency security processing unit for tasks not handled by the lower frequency central processing unit, but due to a high operating frequency may not able to operate down to the low voltages required to withstand PVT attacks.

Therefore, the security processing unit 210 is provided to monitor the PVT operating conditions of the IC 110, and can be operated at higher or lower frequencies as needed. The lower operating frequency can be set at or below the operating voltage that the power-on-reset (POR) module 250 of the security processing unit 210 trips. Therefore, the security processing unit 210 operating at the lower frequency can operate below a tripping point of the POR module 250. The POR module 250 can be powered by voltage Vdd and send a reset signal when tripped by out-of-bounds conditions to reset the system, such as to thwart attacks by hackers.

During normal operation, the security processing unit 210 operates at high frequencies to achieve maximum performance. Before out-of-bounds conditions occur, performance of the security processing unit 210 can be adjusted to a lower frequency so that the security processing unit 210 can continue to monitor on-chip conditions without failing. To maintain security, the timing path detector 230 can lower the operating frequency of the security processing unit 210 when conditions warrant it, e.g., when voltage is trending lower to an out-of-bounds condition. The timing path detector 230 can adjust a frequency to the security processing unit 210 to a lower frequency, e.g., by switching switch 240 between the high and low frequencies, e.g., as described in more detail below. The timing path detector 230 and the switch 240 can be implemented with hardware. In other implementations, the timing path detector 230 and the switch 240 can be implemented with hardware, software, firmware or a combination thereof.

The timing path detector 230 detects when circuit conditions occurring at or near a security processing unit are becoming critical to the functioning of the security of the processing unit, e.g., endangering operations of the security processing unit 210. The circuit conditions can include line speed and other conditions such as PVT conditions. The timing path detector 230 is constructed to switch a frequency of the security processing unit 210 before the security processing unit 210 loses operability. For example, a sensor of the timing path detector 230 can detect when a critical or timing path of the security processing unit 230 is approaching a threshold at which the logic fails to function. The timing path detector 230 can adjust the frequency of the security processing unit 210 before failure of the security processing unit 210.

The timing path detector 230 can include a circuit path which includes the slowest time at which the security processing unit 210 can operate e.g., a determined amount of time that signals can pass between flip-flops at the high frequency. If the timing approaches a speed lower than needed for the high frequency, then the timing path detector 230 can switch the frequency of the security processing unit 210 to the low frequency before the line speed reaches a speed that security processing unit 210 fails. There can also be intermediate frequencies between the high and the low frequency to which the timing path detector 230 can switch the security processing unit 210. The timing path detector 230 can switch to the maximum frequency that the security processing unit 210 can operate at given present conditions on the chip.

When a hacker changes a voltage, temperature, or other process conditions of the IC 110, a goal of the hacker can be to limit the ability of the logic to operate at a nominal frequency. When the logic can no longer operate fast enough, e.g., due to lowering voltage, rising temperature, etc., then the security processing unit 210 can fail, with unpredictable results. The unpredictable results can produce security holes in the system. The timing path detector 230 can implement a critical or timing path which triggers sooner than the actual path of the block being monitored.

When the path of the timing path detector 230 fails, it can be determined that the hardware is getting close to a point that the security processing unit 210 may fail, and an action can be taken. One action is for switch 240 to switch the frequency of the security processing unit 210 from a high value to a low value at which the logic can successfully operate, even under the abnormal operating conditions which have been introduced by the hacker.

If the voltage continues to decrease, then the POR module 250 can trip, resetting the chip. The point at which the logic of the security processing unit 210 fails at the switched lower frequency can be set below the POR module 250 trip point so that the security processing unit 210 can operate through the POR module 250 resetting the system. The determined high and low frequencies can vary depending on the chip. In some implementations the high frequency is about 750 to 1000 MHz and the low frequency is about 50 to 300 MHz.

Figure 3:
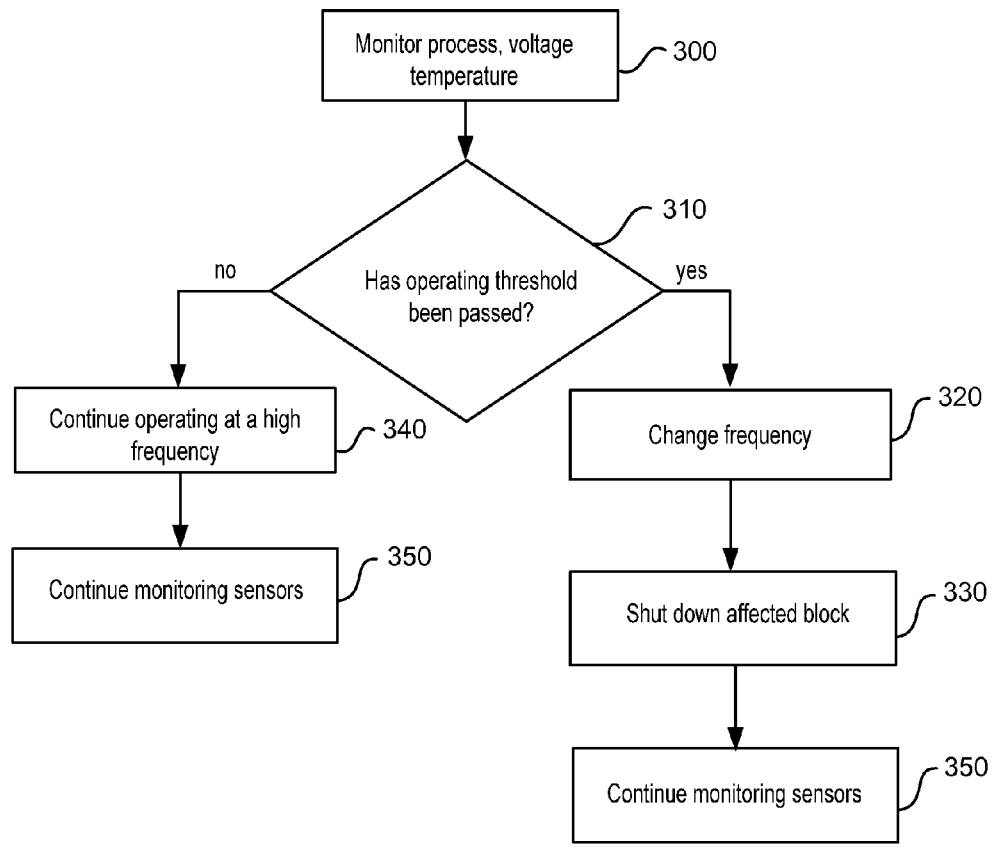
FIG. 3 is a flowchart of describing logic for implementing the circuitry described herein.

FIG. 3 is a flowchart of describing logic for implementing circuitry described herein. The timing path detector 230 can monitor PVT conditions of an IC 110 and/or neighboring circuitry (300). The timing path detector 230 can monitor operating conditions of an area near a security processing unit 210. The timing path detector 230 can compare the operating conditions to a threshold and determine if the threshold has been passed (310). For example, the timing path detector 230 can ensure based on the operating conditions that the security processing unit 210 is operating within determined parameters.

If the threshold is passed, the timing path detector 230 can switch an operating frequency of the security processing unit 210, e.g., by switching the clock frequency of the security processing unit 210 from a high value to a low value, before the security processing unit 210 fails (320). At the low frequency, the security processing unit 210 may be working at a lower performance or power than normal, but the security processing unit 210 can maintain core security functionality. At the low frequency, the security processing unit 210 can operate at a voltage at or below a low voltage tripping point of the POR module 250.

Once the threshold has been passed, and the hardware has switched to a lower frequency, the security processing unit 210 can reset the chip or shut down an affected block, e.g., a smart card interface (330). If the threshold is not passed, the security processing unit 210 can continue to operate at the high frequency (340). Additionally, the timing path detector 230 can switch the frequency to the security processing unit 210 from a low value and a high value when operating conditions improve such that the security processing unit 210 can function at the high value again. Whether the security processing unit 210 is operating at the high frequency or low frequency, it can operate to monitor outputs of the sensors 220A, 220B, 220N to maintain security of system (350).

While various embodiments have been described, it will be apparent that many more embodiments and implementations are possible. Accordingly, the systems and methods are not to be restricted except in light of the attached claims and their equivalents.

What is claimed is:

1. A system, comprising:
   a security processing unit configured to:
      detect when a voltage level crosses a voltage tripping point of a power-on-reset module;
      operate at different clock frequencies, including a nominal clock frequency and a reduced clock frequency compared to the nominal clock frequency; and
      below the voltage tripping point and after the security processing unit is switched to operate at the reduced clock frequency: send, via the power-on-reset module, a reset signal in response to the voltage level crossing the voltage tripping point; and
   a timing path detector in communication with the security processing unit, the timing path detector configured to:
      monitor the voltage level;
      detect when the voltage level crosses a switching threshold; and
      responsive to the voltage level crossing the switching threshold and before the voltage level crosses the voltage tripping point of the power-on-reset module, switch the security processing unit from the nominal clock frequency to the reduced clock frequency, before the security processing unit fails from the voltage level.

2. The system of claim 1, where the timing path detector is configured to switch the security processing unit to the nominal clock frequency from the reduced clock frequency when the voltage level increases above the switching threshold.

3. The system of claim 1, where the security processing unit is included in a system-on-a-chip integrated circuit.

4. The system of claim 1, where security processing unit is configured to function as a key router.

5. The system of claim 1 where the security processing unit is configured to operate at lower than peak performance while maintaining security monitoring functionality after the timing path detector switches the security processing unit to the reduced clock frequency.

6. A method, comprising:
monitoring an operating condition by a security processing unit operating at a nominal frequency;
detecting when the operating condition crosses a switching threshold;
responsive to the operating condition crossing the switching threshold and before a voltage level crosses a voltage tripping point of a power-on-reset module, switching the security processing unit from operation at the nominal frequency to operation at a reduced frequency; and
below the voltage tripping point and after switching the security processing unit to operate at the reduced frequency, sending a reset signal via the power-on-reset module of the security processing unit.

7. The method of claim 6, where the switching threshold includes voltages under a low voltage threshold or temperatures above a high temperature threshold, or both.

8. The method of claim 6, where the switching occurs before the security processing unit loses operability.

9. The method of claim 6, further comprising shutting down a block affected by the operating condition.

10. The method of claim 6, further comprising switching the security processing unit from operation at the reduced frequency to operation at the nominal frequency when the operating condition improves.

11. The method of claim 6, where the security processing unit operates at less than peak performance at the reduced frequency.

12. A method, comprising:
detecting by a timing path detector when a condition of a security processing unit crosses a switching threshold affecting functionality of the security of the processing unit; and
responsive to the condition crossing the switching threshold and at a point before a voltage tripping point of a power-on-reset module, reducing an operating frequency of the security processing unit before the security processing unit loses the functionality; and
after reducing the operating frequency and at a point past the voltage tripping point of the power-on-reset module of the security processing unit, sending a reset signal from the security processing unit.

13. The method of claim 12, where detecting the condition includes detecting a timing path of the security processing unit.

14. The system of claim 1, where the timing path detector is further configured to reduce the clock frequency responsive to a temperature of the security processing unit.

15. The system of claim 1, where the reset signal is configured to prevent operation of a computer system in an out-of-bounds condition.

16. The system of claim 1, where the timing path detector is further configured to:
monitor a temperature;
detect when the temperature crosses a temperature threshold; and
responsive to the temperature crossing the temperature threshold, switch the security processing unit from the nominal clock frequency to the reduced clock frequency.

17. The system of claim 1, where the security processing unit is configured to shut down a block affected by the voltage level.

18. The method of claim 6, where sending the reset signal comprises sending the reset signal to prevent operation of a computer system in an out-of-bounds condition.

19. The method of claim 12, where the switching threshold comprises a temperature threshold, a voltage threshold, or both.

20. The method of claim 12, further comprising, after reducing the operating frequency of the security processing unit, shutting down a block affected by the condition.

* * * * *